(12) United States Patent
Oswal (10) Patent No.: US 6,181,883 B1
(45) Date of Patent: *Jan. 30, 2001

(54) DUAL PURPOSE CAMERA FOR VSC WITH CONVENTIONAL FILM AND DIGITAL IMAGE CAPTURE MODULES

(75) Inventor: Abhay Oswal, Fremont, CA (US)

(73) Assignee: PicoStar, LLC, Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/879,826

(22) Filed: Jun. 20, 1997

(51) Int. Cl.[7] .................................................. G03B 29/00

(52) U.S. Cl. .............................. 396/429; 348/64; 348/376

(58) Field of Search ............................... 396/429; 348/64, 348/220, 373, 376, 231, 233, 374, 375, 266, 272, 273, 275, 280

(56) References Cited

U.S. PATENT DOCUMENTS

| | | | |
|---|---|---|---|
| 5,055,863 | | 10/1991 | Lindenfelser et al. .................. 354/75 |
| 5,282,040 | * | 1/1994 | Sapir ................................. 396/429 X |
| 5,561,458 | * | 10/1996 | Cronin et al. ........................... 348/64 |
| 5,570,146 | | 10/1996 | Collette ................................ 396/429 |
| 5,619,257 | | 4/1997 | Reele et al. ............................. 348/64 |
| 5,845,166 | * | 12/1998 | Fellegara et al. ..................... 396/429 |
| 5,847,758 | * | 12/1998 | Iizuka .................................. 348/280 |
| 5,917,556 | * | 6/1999 | Katayama ............................ 348/280 |
| 5,926,215 | * | 7/1999 | Whipple et al. ..................... 348/280 |
| 5,945,977 | * | 8/1999 | Nishiwaki ............................ 348/280 |

* cited by examiner

*Primary Examiner*—David M. Gray
(74) *Attorney, Agent, or Firm*—Martine Penilla & Kim, LLP (57) ABSTRACT

A dual purpose camera for alternative use with one of photographic film and a digital image capture module is described. The camera includes a camera body, an electrical interface means disposed within said camera body for interfacing the camera body with a digital image capture module; and a communication means disposed within said camera body for transferring data from the digital image capture module to devices external to the camera body.

14 Claims, 4 Drawing Sheets

2
DUAL PURPOSE CAMERA FOR VSC WITH CONVENTIONAL FILM AND DIGITAL IMAGE CAPTURE MODULES

BACKGROUND OF THE INVENTION

1. Field of the Invention

The present invention relates to image capture. More particularly, the present invention relates to a digital image capture module for use in a conventional still camera in place of photographic film.

2. The Prior Art

Digital cameras which capture and store a series of images as digital information using digital image sensing and semiconductor memories are known in the art. Examples of such cameras are the Color QuickCam available from Connectix, the ePhoto 307 Color digital camera available from AGFA, and the DC20, DC25, and DC120 model cameras available from Kodak. Instead of employing photographic film which must be chemically developed to produce images which are printed on transparencies or photographic paper, these cameras operate by focussing an image on a semiconductor imaging plane and then storing the image in a semiconductor memory in the camera.

Other digital cameras are available for the professional market and provide higher resolution digital images than the consumer digital cameras referred to above. These cameras are specially designed and cost in excess of several thousand dollars.

One or more images captured by the camera may be downloaded to a computer or other device through a serial or parallel interface provided in the camera using software running on the computer or other device. Once downloaded to a computer, the images may be displayed on the computer display, manipulated and used in documents generated on the computer, and even printed onto paper by a printer connected to the computer.

While such prior-art digital cameras have achieved widespread popularity, they are presently limited in several respects. Such limitations include lower image quality due to low pixel resolution and inexpensive optics and inability to change lenses and aperture settings in the case of the consumer digital cameras, and high cost in the case of the professional cameras.

It would be advantageous to employ conventional photographic film cameras to capture digital images. If traditional photographic film cameras could be so employed, a user could simply convert an existing camera into a digital one while taking advantage of the many features which such cameras provide, such as better optics, interchangeable lenses, manual aperture adjustment, autoexposure settings, etc., while retaining the option of using conventional photographic film as well.

It is therefore an object of the present invention to provide an economical digital image capture apparatus which may be used with conventional photographic film cameras.

It is another object of the present invention to provide an economical digital image capture apparatus which may be easily used with conventional photographic film cameras from which a user can easily download images into a personal computer, a printer, a storage device, a display device, a docking station, a remote device via a modem or network interface.

It is a further object of the invention to provide a digital image capture apparatus in a package having the form factor of a standard photographic film container such as a 35 mm or other form factor cartridge.

Yet another object of the present invention is to provide a dual use camera which may employ conventional photographic film or the digital image capture apparatus of the present invention.

BRIEF DESCRIPTION OF THE INVENTION

A digital image capture module is provided according to the present invention for use with a photographic film camera having a defined photographic film format such as 35 mm. The digital image capture module of the present invention includes an imaging array having a focal plane, the imaging array configured to convert an optical image focused on the focal plane to electronic image signals. A digital memory is provided for storing image data. Control circuitry communicates with the imaging array for converting the electronic image signals into digital image information, for writing the digital image information into the digital memory, and for reading the digital image information from the digital memory onto an interface bus, or a port, such as a serial, parallel, SCSI, or Firewire port.

The digital image capture module of the present invention is disposed in a housing having the form factor of a photographic film holder for the defined format. The imaging array is electrically connected to and physically oriented with respect to the housing of the digital image capture module such that when the housing is disposed in a photographic film camera having the defined photographic film format, the imaging array is positioned at the focal plane of the photographic film camera as if it was a frame of photographic film ready to be exposed.

According to one embodiment of the present invention, a source of electrical power for the module comprising one or more batteries is located within the housing of the module. In another embodiment of the invention, the power source for the module is located elsewhere in the camera outside of the housing and is electrically connected to circuitry disposed inside the housing.

According to another embodiment of the invention, a transparent window in the camera back is used to optically upload the contents of the module to a computer or other electronic device. RF techniques may also be used to upload the images. In other embodiments of the invention a specially adapted camera back provides controls for the module and a connector and/or an optical, infrared, RF window or other means for uploading the contents of the module.

According to another embodiment of the invention, a dual-use camera is provided which may either employ standard photographic film or the digital image capture apparatus of the present invention. Such a camera provides a physical and data interface to the digital image capture apparatus.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
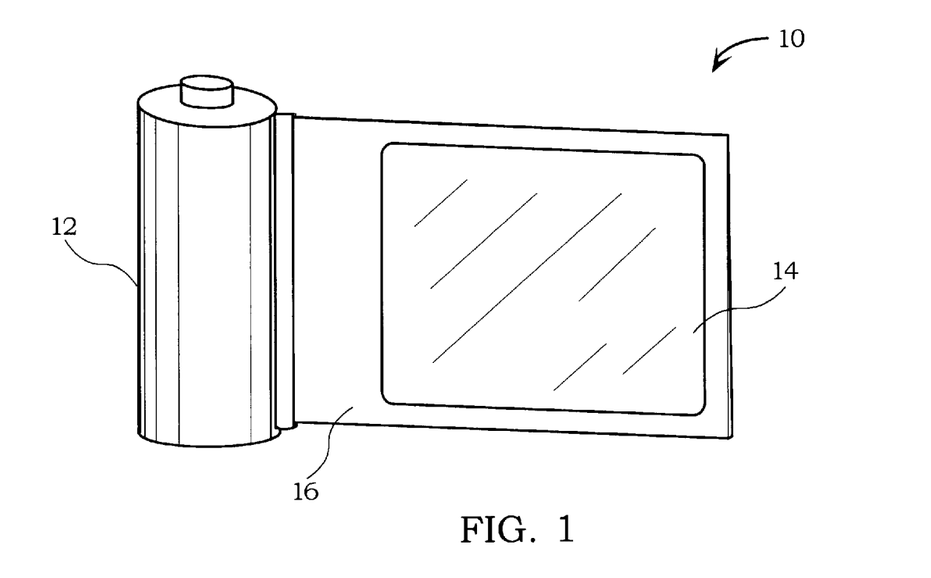
FIG. 1 is an isometric view of a presently preferred embodiment of the digital image capture module of the present invention.
Figure 2:
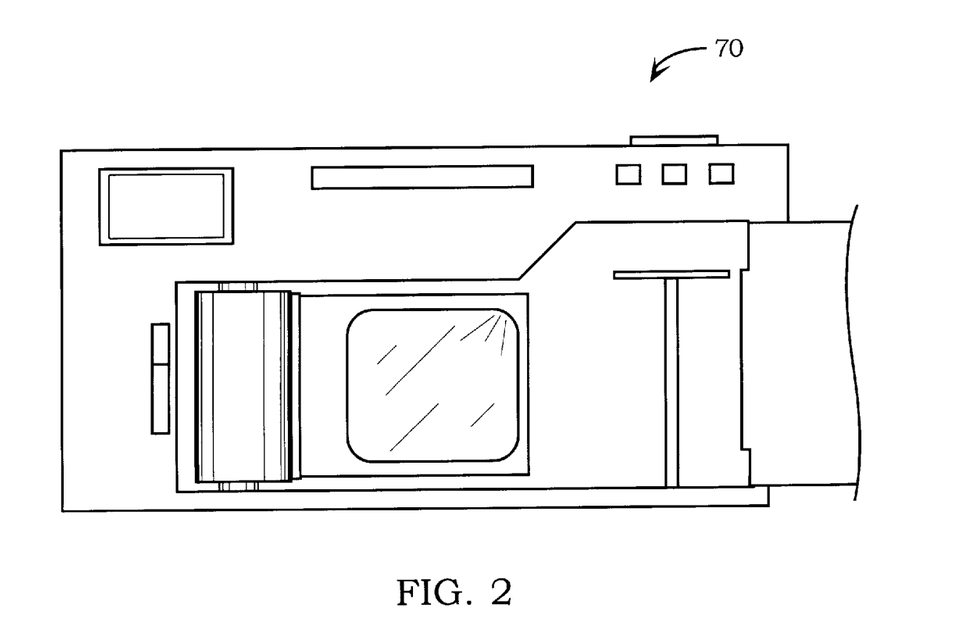
FIG. 2 is an isometric view of a presently preferred embodiment of the digital image capture module of the present invention in place within a photographic camera, showing the orientation of the imaging array at the focal plane of the camera.

Referring first to FIG. 1 an isometric view of a presently preferred embodiment of a digital image capture module according to the invention is shown. According to the present invention, the digital image capture module is for use with a photographic film camera having a defined photographic film format and is used with a regular camera in place of the photographic film which would normally be loaded into the camera for taking pictures. As will be apparent from an examination of FIG. 1, the illustrative embodiment depicted therein is for use with 35 mm format cameras, but the present invention is not limited to a digital image capture module for a 35 mm camera. From the disclosure herein, persons of ordinary skill in the art will readily be enabled to make and use embodiments of the present invention for other camera size formats.

In the embodiment of FIG. 1, the digital image capture module 10 is disposed in a housing 12. The illustrative embodiment of the digital image capture module of the present invention disclosed herein is designed to be the same size(form factor) as a conventional 35 mm film cartridge so that it mechanically fits in the space inside a standard 35 mm camera where a conventional 35 mm film cartridge is loaded. However, the shape of housing may differ from the appearance of the conventional film cartridge—the important criteria being that it fits in the same space.

An imaging array 14, disposed on a flexible member 16 such as a flex circuit which also serves to make electrical connections between the imaging array 14 and control circuitry disposed within the housing 12, extends from the housing 12 in the same way that the end of a roll of photographic film would extend from a conventional 35 mm film canister. Imaging array 14 is disposed on substrate 16 so as to align with the focal plane of the camera when the housing 12 is inserted in the camera and the camera back is closed.

The imaging array 14 may consist of a thin CMOS based image-receptor silicon wafer having an area of preferably about 35×24 mm, supported by a substrate comprising a thin backing material, such as flex circuit material or a rigid material. The total thickness of the receptor with the backing will be less than about 1.0 mm, so it can be squeezed behind the back cover of the camera where the conventional 35 mm frame resides during operation. Imaging array 14 may possibly have reinforced corners that snap into the camera body at the focal plane of the camera. CMOS imaging arrays suitable to be employed in the present invention are known in the art.

The imaging array 14 may be attached to the main body by means of a flexible, hinge-like joint or simply by the flex nature of the flex-circuit material itself.

An auxiliary enclosure may be attached to the distal end of the image array 14, opposite to the housing, in order to augment the space provided by the housing. The auxiliary enclosure holds a battery, memory and/or additional circuitry to facilitate or enhance the digital image capture module operation. This auxiliary enclosure may be designed to fit in the space where the conventional film is attached to the take-up spool. Alternately, one or more batteries may be disposed within the housing itself. Some 35 mm camera models may not have adequate space in their bodies for such an auxiliary enclosure.

From an operational standpoint, the digital image capture module of the present invention functions much like the conventional film. Once one or more images are captured on the digital image capture module, the image information is transferred to a local computing device, a printer, a display device, a docking station or a remote location via a modem, network or internet connection, etc. Host resident software and software/firmware in the digital image capture module is used to control the transfer operation. As presently contemplated, a docking station may be used in conjunction with the digital image capture module to transfer images from the digital image capture module. The docking station also facilitates other needs of digital image capture module, such as erasure of image data, recharging of its batteries and a safe container. Alternate embodiments for transferring image data comprise connecting the digital image capture module directly to a serial port, a Firewire port, a parallel/SCSI port in a PC, or a high speed modem, etc. Data transfer processes and apparatus are well known in the art.

The main body or housing of the digital image capture module in the approximate shape of a conventional 35 mm film cartridge as illustrated in FIG. 1 contains all the logic, memory and processing circuitry. It may include a small LCD display, showing the current frame counter. The LCD display may also be used to indicate the battery level as is known in the art. One or more button switches may be available for user functions such as reversing and/or resetting the counter, thereby discarding one or more previously stored images and changing the resolution of image capture, etc. A communications port is built into the base or elsewhere in the main body to upload image frames to a computing device locally or remotely. Alternatively, as previously indicated, communication may be accomplished wirelessly via infrared, RF, etc. An edge connector may be added to connect to a capture docking station or other apparatus. A switch is built in to sense closure of the camera back cover, to enable operation and activate the imaging function.

Figure 3:
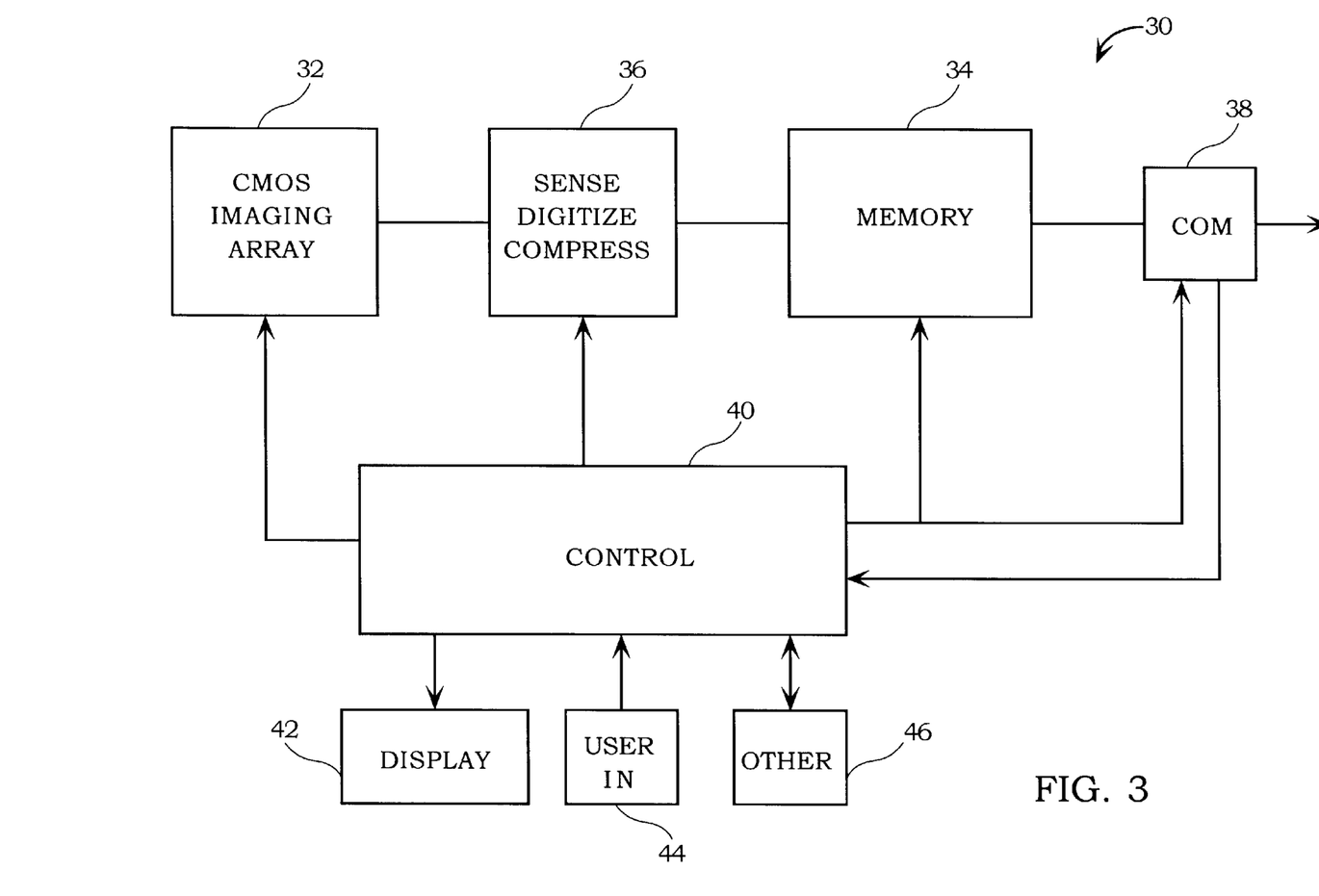
FIG. 3 is a block diagram of a presently preferred embodiment of circuitry which may be employed in the digital image capture module of the present invention.

A block diagram of illustrative circuitry 30 for the digital image capture module is shown in FIG. 3. A CMOS imaging array 32 communicates with a memory 34, which may comprise, for example, a DRAM array having a capacity of 16 MB, via sensing, digitizing, and compression circuitry 36. Sensing, digitizing, and compression circuitry 36 includes the sense amplifiers and other related circuitry, such as analog-to-digital converters for transferring the image out of the array. In order to improve memory usage, compression may be applied to the digital image data in sensing, digitizing, and compression circuitry 36. Digital compression techniques are well known in the art. A communications interface 38 is employed to transfer data from the memory 34 to a computer or other device for processing, display, and storage.

A control circuit 40 directs the operation of the imaging array 32, the memory 34, sensing and compression circuitry 36, and communications interface 38. As is known in the art, control circuit 40 may comprise a CPU, firmware, communications and other logic.

User interface elements, such as an LCD display 42, one or more input switches 44, and other elements, such as a frame advance audible indicator 46, etc., may be connected to control circuit 40.

Figure 4:
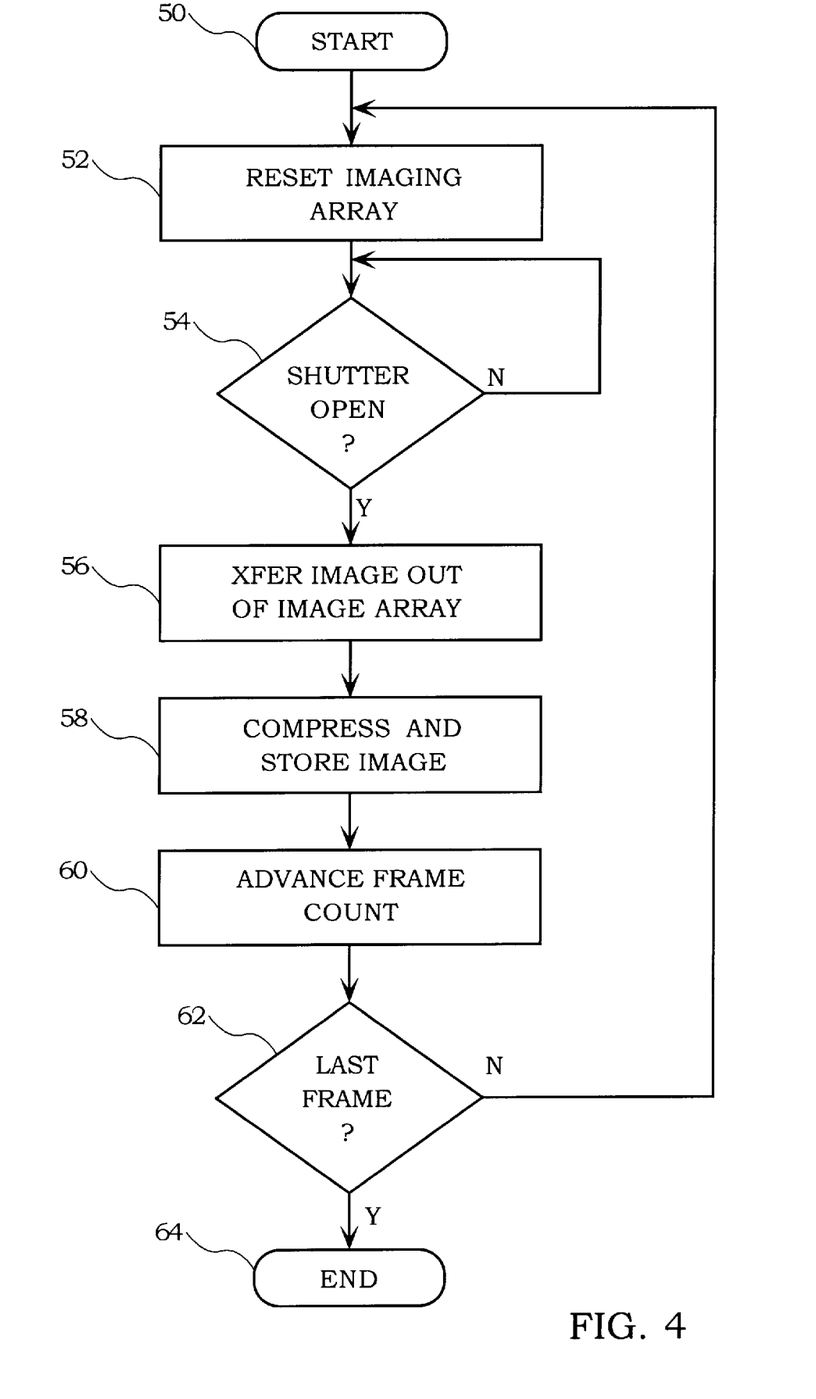
FIG. 4 is an illustrative flow diagram of the operation of the digital image capture module of the present invention.

Referring now to FIG. 4, an illustrative flow diagram of the operation of the digital image capture module is presented. Persons of ordinary skill in the art will recognize that the flow diagram of FIG. 4 is merely illustrative and not limiting as to the operation of the digital image capture module of the present invention.

First, at step 50, the system is reset. If the module is in a quiescent state, the first shutter release sending light, closing the back cover, or other known methods, may trigger an active image capture state. At step 52, the imaging array is activated and the system loops around step 54 waiting for the camera shutter to open. This state is referred to hereinafter as a "photo session" state in which the imaging array 14 is activated. When the camera shutter opens, the image on the focal plane of the camera is sensed by the imaging array. When the shutter closes, the image is transferred out of the image array at step 56 and compressed and stored into the memory at step 58.

Next, at step 60, the frame count is advanced. If an LCD or other display is used, the displayed frame number is updated. At step 62 the count is examined. If the frame just stored was not the last frame, control returns to step 52, where the imaging array is cleared to await the shutter opening for the next frame capture. If the frame just stored was the last frame, process control proceeds to step 64, to signify the end of the image capture process.

One approach to sensing opening of the shutter is to provide a fixed number, for example, five "always-on" pixels in the imaging array that will always be sensing light, including during the quiescent mode (which is the idle mode during which all other sensor pixels are inactive, awaiting activation of a photo session). These "always-on" pixels are preferably uniformly spread across the sensor surface in a manner such that when an image is received, likelihood of at least one of them sensing light is very high. Thus, the shutter shall be deemed "closed" when none of these special pixels simultaneously detect any light.

The shutter open event will he detected by at least one of the "always-on" pixels sensing light, and considered open until shutter closure is detected. Subsequently the shutter closure shall be implied by all pixels simultaneously sensing no light. Upon shutter closure, digital image capture module logic will start a mode timer at the expiration of which digital image capture module will return to quiescent mode if no further shutter open is detected. Otherwise, if the shutter open event occurs prior to mode timer expiration, the photo session will continue.

As is known in the art, the image capacity of the digital image capture module of the present invention depends on memory size, image resolution, and image compression. For a given memory size, different resolution settings may be provided, resulting in a different number of frames possible for different selected resolutions. In an exemplary embodiment of the digital image capture module of the present invention where the size of the memory is 16 MB, 20 frames at a resolution of 1500×1000 using 256 grey shades may be stored in the memory or 80 frames at a resolution of 750×500 may be stored in the memory, assuming a compression ratio of 2:1.

Persons of ordinary skill in the art will appreciate that color will reduce this capacity. A color imaging array having red (R), green (G), and blue (B) pixels employs three times the number of pixel elements as does a grey scale imaging array for the same resolution. A simple scheme would be to use 3 actual pixels in close proximity to capture the three components R, G & B of each light element.

The following two illustrative schemes enable storage of the three color components R, G, and B associated with each pixel element effectively using only twice the physical pixel space instead of three times (one for each component). Both capitalize on the phenomena that the green component of a picture element contains about two third of the light intensity, and the red and blue share the remaining third. These schemes, therefore, for each actual picture element of an image allocate one green pixel and effectively only half pixel each for the other two, thereby using a total of two physical pixels to provide the three components. These both employ one green pixel for each picture element location, while one red pixel for each alternate picture element, effectively using half as many pixels for the red component. The same approach is used for the blue pixels.

According to both schemes, appropriate red, green, and blue optical filters are disposed over the imaging array to provide color sensitivity. Use and implementation of such filters is known in the art.

A first approach employs pixel sensing elements in the following order:

GRGBGRGBGRGBGRG . . .
RGBGRGBGRGBGRGB . . .
GBGRGBGRGBGRGBG . . .
BGRGBGRGBGRGBGR . . .

Another scheme employs pixel sensing elements in the following order:

GRGRGRGRGRGRGRG . . .
BGBGBGBGBGBGBGB . . .
GRGRGRGRGRGRGRG . . .
BGBGBGBGBGBGBGB . . .

While two illustrative color sensing schemes have been disclosed herein, persons of ordinary skill in the art will appreciate that other schemes may be employed in the present invention.

The digital image capture module may be inserted into a capture docking device or otherwise connected to a computer when captured images need to be processed. The capture docking station is designed to provide stand-alone processing of the images, or to connect the digital image capture module to a PC, a computer network, a printer, a computer display screen or a TV. The docking station will typically connect to a PC or other device or system through a high speed port such as Firewire, SCSI or parallel port as is known in the art.

When a digital image capture module is removed from its host camera, a docking station may be used with the present invention. A docking station would provide a safe storage case for ease in handling as well as reduced risk of damage by accident, environment and soil by human contact. It will facilitate transfer of captured images using wire or wireless schemes and provide a means to recharge digital image capture module batteries. Such a docking station may also be used for local searching, viewing, editing, text and sound annotation, indexing, rearrangement and deletion of images by means of a combination of components such as a microphone, a suitable display screen, an attachable keyboard and/or a pointing device. The docking station could also enable archive/search/retrieval of images from a built-in bulk storage device.

A number of docking station types may be designed by combining one or more of the above features, to address user needs in a number of market segments. For example, a minimal dock may comprise a simple protective case that exposes the communications port on the digital image capture module to facilitate connection to an image upload device, as well as recharge the batteries. A fully loaded docking station may house a sizable bulk storage device, sport a large LCD screen that displays both thumbnail size as well as full size images, allows significant editing, image processing, text/graphics/sound annotations, etc. In essence, a docking station may serve the purpose of a feature rich digital album, obviating the need for a host PC altogether for many users.

When the digital image capture module is loaded in the camera and the back cover closed, the user emulates the conventional approach, such as advancing the film advance lever a few times to set the film counter to 1. This would enable the shutter operation in a typical camera. As a result of back cover closure being sensed, the logic in the digital image capture module initializes itself to accept new images starting from the current frame counter. The frame counter may be reversed at any time by user by pressing a button on the digital image capture module to cause its latest stored frame to be erased. The same button, if held down, for example, for two seconds, will reset the frame counter to 1 and erase all frames. These features enable the user to discard selected frames or sequences of frames and start again from any specific counter value. Unlike conventional film, the user can open the camera back cover at any time to adjust the frame counter. The frame counter is also adjustable or resettable to 1 by host software during the upload process. Interfaces for such user control are well known in the art.

Once the digital image capture module is loaded in the camera and the shutter is pressed, the image is captured by the imaging array, and sent to memory. The internal frame counter is advanced to the next empty frame. Unlike the conventional film, no physical motion takes place; the imaging array remains fixed in the same space.

The battery logic will keep memory alive at all times. According to a presently preferred mode of operation, the imaging array will, however, be turned on only when the user is ready to take pictures. As stated earlier, the user can indicate this by pressing the shutter once at the start of a session or by other known means. No image will be captured and the internal frame counter is not advanced by this action. Once a photo session begins, the imaging array will stay on for a preset time to allow additional pictures during the session. When this time expires, the activation process will need to be repeated. Alternatively, opening the back cover and closing it will also cause imaging array activation. Audible tones may be generated to differentiate between start of a session, capture of an image, and end of a session.

Once digital images are captured on digital image capture module, they need to be uploaded, decompressed, color transformed, brightness/contrast adjusted, and/or color corrected, etc. before they can be displayed or printed. The image may also be subjected to user desired modifications, indexing, captioning, editing, cleanup, combining, etc.

This process is performed within a desktop PC, a network PC (or an NC), or another suitable device, such as a specially designed docking station discussed elsewhere in this document, by means of software utilities or applications as is known in the art. Examples of such off-the-shelf products would be, Hotshot from PictureWorks, PhotoDeluxe from Adobe, MyQuickTakeApp from Apple Computer, etc.

Typically, a basic set of features would be included within a software utility packaged with digital image capture module. The user may then optionally acquire additional functionality by off-the-shelf upgrade from a retailer, or an application directly from a manufacturer.

According to another embodiment of the present invention, a dual purpose camera is provided. The dual purpose camera of the present invention can be used either with conventional photographic film or with the digital image capture module of the present invention. An illustrative embodiment of such a dual purpose camera is illustrated in FIGS. 5 and 6.

Figure 5:
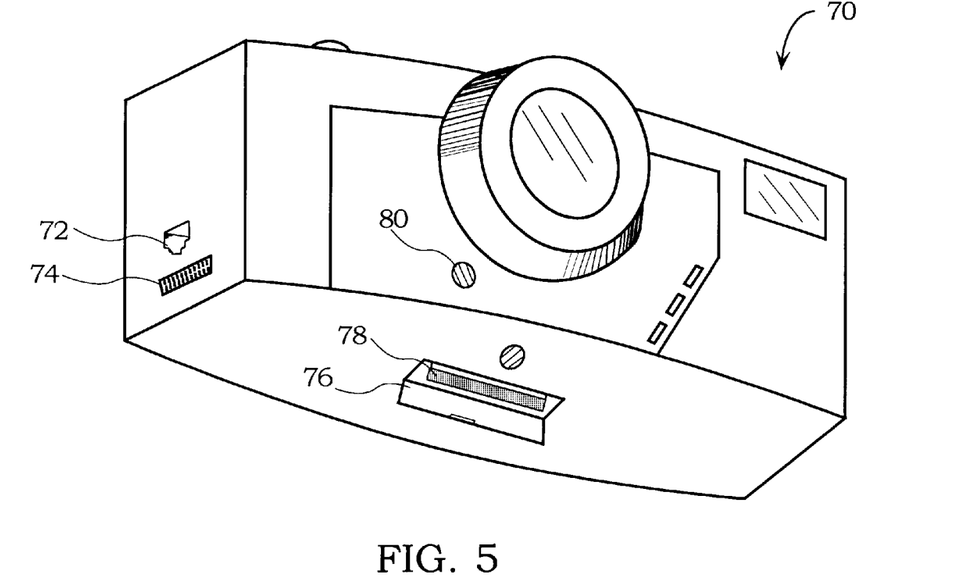
FIG. 5 is a perspective view of an illustrative embodiment of a dual purpose camera according to the present invention showing several of its features.

FIG. 5 is a perspective view of an illustrative embodiment of a dual purpose camera 70 according to the present invention showing several of its features.

Figure 6:
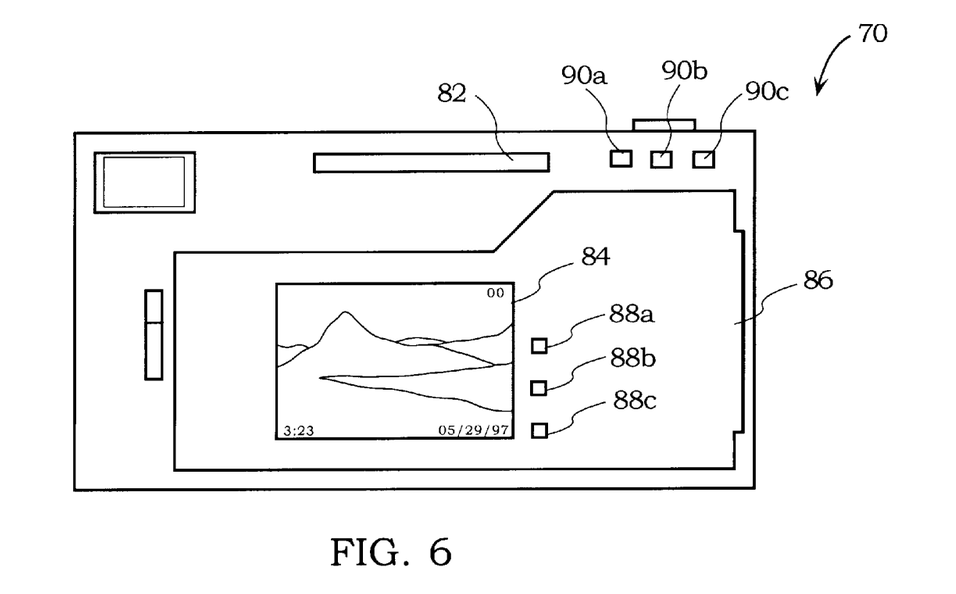
FIG. 6 is a rear view of an illustrative embodiment of a dual purpose camera according to the present invention showing several of its features.

FIG. 6 is a rear view of an illustrative embodiment of the dual purpose camera 70 according to the present invention showing several other ones of its features.

For a dual-purpose camera according to the present invention, a special somewhat simpler and less costly version of the digital image capture module of the present invention is contemplated. This digital image capture module of the present invention would utilize internal camera battery and the film counter (plus battery level) display built into the camera body. Electrical contact between the digital image capture module and the host camera may be made as is conventional in the electronics art by use of electrical contacts or connectors which provide mating electrical connections between the digital image capture module and the camera body.

In addition, as shown in FIG. 5, such a camera 70 would include a communications port which may comprise an RJ-11 or similar connector 72 or other communications port connector 74. The communications port allows image data to be uploaded from the digital image capture module for use by a computer or other viewing device as previously described herein. In addition, a hinged cover 76 on the camera body may be opened to expose an edge connector 78 for connection of the camera 70 to a docking station for uploading, storing, editing, and/or viewing captured images.

Employing a communications port on the camera body eliminates the need for pulling out the digital image capture module cartridge for the upload purpose, reducing the chores and risk of handling. The camera can also be designed to house a short length of a built-in communication cable that directly connects to a PC, or modem etc. The camera may also be designed with a wireless (infrared, RF, microwave, etc.) transmitter/receiver for exchanging image data with a suitably located host device. Such systems are known in the art.

A microphone 80 and associated circuitry may be added to the camera to enable sound annotation or live sound capture onto a digital image as is known in the art.

A socket 82 (FIG. 6) may be provided for a bulk storage device such as a tiny hard disc, a PCMCIA slot or a flash memory module insertable into the camera body or its back to increase the frame storage capacity of the digital image capture module significantly. This feature has the potential of facilitating longer sequences of animation at, for example, a sports event, or even enable a limited video capability with much higher image quality than typical today. Such storage would also require additional battery power, which would need to be incorporated into the camera.

By locating control buttons and film counter display on the camera body, digital image capture module package would be simplified, thereby enhancing user convenience as well as reducing the cartridge cost.

A "deluxe" version of the camera may sport a back with a built-in digital image capture module sensor, logic and memory, so as to allow installation of a conventional film to supersede the digital operation, without having to remove the digital image capture module components. Thus, the camera acts as a digital device without the conventional film, and as a conventional camera when the conventional film is installed (the digital sensor having been slightly adjusted manually or automatically and shield protected to prevent damage from film movement to accommodate the normal film), the camera switching to the conventional mode when such a film is sensed.

A sizable LCD display 84 including frame number and date and time indicators as shown may be provided on the camera back 86. It could also be used to add text or graphic captions, or an indexing scheme to facilitate searching for an image. Control buttons 88a, 88b, 88c or optional touch input on LCD display are used to control the LCD display and may provide features such as image search/selection, rearrangement, date and time programming, enable/disable of date and time display, captions, etc. In addition, control buttons, 90a, 90b, 90c for the digital image capture module can allow control of features such as image erase, bulk erase, frame advance, indexing, backup, etc. Control interfaces for such functions are well understood in the art.

Additional information such as underexposure/ overexposure lighting conditions, background lighting, use of flash, filters, special lenses systems etc. from the camera may be appended to a digital image for an automatic compensation by software for these conditions when image is eventually processed for viewing or printing.

The dual-purpose camera according to this aspect of the invention eliminates the need for pressing shutter to start a photo session because turning the camera power on will simultaneously activate the power to the digital sensor.

While embodiments and applications of this invention have been shown and described, it would be apparent to those skilled in the art that many more modifications than mentioned above are possible without departing from the inventive concepts disclosed herein. The invention, therefore, is not to be restricted except in the spirit of the appended claims.

What is claimed is:

1. A digital image capture module for use with a photographic film camera having a shutter, the photographic film camera having a space for loading a film cartridge and being configured to advance the film in the film cartridge for capturing images on the film, the digital image capture module comprising:

a housing configured in the shape of the film cartridge such that the housing is capable of being fit within the space provided for the film cartridge in the photographic film camera;

a substrate coupled to the housing;

an imaging array disposed on said substrate for receiving and converting an optical image to digital image signals, the imaging array having a set of first pixels for capturing an image, the first pixels including a set of second pixels for sensing the opening of the shutter when any one of the second pixels detects light, the second pixels being positioned in the imaging array so that each of the second pixels is capable of sensing the opening of the shutter independent of other second pixels, wherein the imaging array captures an image on a focal plane of the photographic film camera in response to the sensing of the opening of the shutter by any one or more of the second pixels; and a digital memory for storing the digital image signals as one or more image frames.

2. The digital image capture module as recited in claim 1, wherein the set of second pixels are always on for sensing light through the shutter.

3. The digital image capture module as recited in claim 2, wherein the set of second pixels are spread across the image array to increase the probability of at least one of the second pixels sensing light through the shutter.

4. The digital image capture module as recited in claim 3, wherein the set of second pixels are spread uniformly across the image array.

5. A digital image capture module for use with a photographic film camera having a shutter, the photographic film camera having a space for loading a film cartridge and being configured to advance the film in the film cartridge for capturing images on the film, the digital image capture module comprising:

a housing configured in the shape of the film cartridge such that the housing is capable of being fit within the space provided for the film cartridge in the photographic film camera;

a substrate coupled to the housing;

an imaging array disposed on said substrate for receiving and converting an optical image to digital image signals when the shutter is opened, the imaging array having a set of first pixels for capturing the optical image, the first pixels including a set of second pixels for sensing the opening of the shutter when any one of the second pixels detects light, the optical image comprising a plurality of first pixels, each of which includes red (R), green (G), and blue (B) color components, wherein one G pixel is used for half of the first pixels corresponding to the optical image, and wherein one R pixel and one B pixel are used for the other half of the first pixels in the optical image; and a digital memory for storing the digital image signals as one or more image frames.

6. The digital image capture module as recited in claim 5, further comprising:

a color filter disposed over said imaging array for providing color sensitivity, said color filter including R, G, and B pixel sensing elements.

7. The digital image capture module as recited in claim 6, wherein one G pixel sensing element is assigned to half of the first pixels corresponding to the optical image while one R and one B pixel sensing elements are assigned to the remaining half of the first pixels.

8. The digital image capture module as recited in claim 7, wherein the R, G, and B pixel sensing elements are arranged in accordance with an order defined by GRGB or RGBG.

9. The digital image capture module as recited in claim 7, wherein the R, G, and B pixel sensing elements are arranged in accordance with an order defined by GRGR or BGBG.

10. The digital image capture module as recited in claim 5, wherein the set of second pixels are always on for sensing light through the shutter.

11. A digital image capture module for use with a photographic film camera having a shutter, the photographic film camera having a space for loading a film cartridge and being configured to advance the film in the film cartridge for capturing images on the film, the digital image capture module comprising:

a housing configured in the shape of the film cartridge such that the housing is capable of being fit within the space provided for the film cartridge in the photographic film camera;

a substrate coupled to the housing;

an imaging array disposed on said substrate for receiving and converting an optical image to digital image signals, the imaging array having a set of first pixels for capturing the optical image, the first pixels including a set of second pixels for sensing the opening of the shutter when any one of the second pixels detects light, wherein the imaging array captures an image on a focal plane of the photographic film camera in response to the sensing of the opening of the shutter by the set of second pixels, the optical image comprising a plurality of first pixels, each of which includes red (R), green (G), and blue (B) color components, wherein one G pixel is used for half of the first pixels corresponding to the optical image, and wherein one R pixel and one B pixel are used for the other half of the first pixels in the optical image; and a digital memory for storing the digital image signals as one or more image frames.

12. The digital image capture module as recited in claim 11, wherein the set of second pixels are always on for sensing light through the shutter.

13. The digital image capture module as recited in claim 12, wherein the set of second pixels are spread across the image array to increase the probability of at least one of the second pixels sensing light through the shutter.

14. The digital image capture module as recited in claim 11, further comprising:

a color filter disposed over said imaging array for providing color sensitivity, said color filter including R, G, and B pixel sensing elements, wherein one G pixel sensing element is assigned to half of the first pixels corresponding to the optical image while one R and one B pixel sensing elements are assigned to the remaining half of the first pixels.

* * * * *